(12) United States Patent
Coffman et al.

(10) Patent No.: US 10,579,976 B2
(45) Date of Patent: *Mar. 3, 2020

(54) SYSTEMS AND METHODS FOR SPLITTING A BILL ASSOCIATED WITH A RECEIPT

(71) Applicant: Capital One Services, LLC, McLean, VA (US)

(72) Inventors: Ben M. Coffman, Newbury Park, CA (US); Dennis S. Brennan, Pleasanton, CA (US); Richard S. Just, Berkeley, CA (US); Joseph O'Brien, San Francisco, CA (US); Katharine Anne Shea, Provindence, RI (US); Bryan Fearson, Herndon, VA (US); Timothy J. Austen, Manassas, VA (US); Shaun Webb, San Francisco, CA (US); Nicholas Sheehan, Vienna, VA (US)

(73) Assignee: Capital One Services, LLC, McLean, VA (US)

(*) Notice: Subject to any disclaimer, the term of this patent is extended or adjusted under 35 U.S.C. 154(b) by 399 days.

This patent is subject to a terminal disclaimer.

(21) Appl. No.: 15/615,220

(22) Filed: Jun. 6, 2017

(65) Prior Publication Data

US 2017/0270500 A1 Sep. 21, 2017

Related U.S. Application Data

(63) Continuation of application No. 14/103,743, filed on Dec. 11, 2013, now abandoned.

(Continued)

(51) Int. Cl.
*G06Q 20/10* (2012.01)
*G06Q 20/14* (2012.01)
(Continued)

(52) U.S. Cl.
CPC .......... *G06Q 20/14* (2013.01); *G06Q 20/102* (2013.01); *G06Q 20/227* (2013.01); *G06Q 30/04* (2013.01); *G06Q 30/02* (2013.01); *G06Q 50/01* (2013.01)

(58) Field of Classification Search
None
See application file for complete search history.

(56) References Cited

U.S. PATENT DOCUMENTS

| | | |
|---|---|---|
| 2012/0166298 A1 | 6/2012 | Smith et al. |
| 2013/0006782 A1 | 1/2013 | Schwarzkopf et al. |

(Continued)

*Primary Examiner* — Joseph W. King
(74) *Attorney, Agent, or Firm* — Finnegan, Henderson, Farabow, Garrett and Dunner, LLP

(57) ABSTRACT

Systems and processes are disclosed for providing bill splitting processes for splitting a bill amount among a set of purchasers. In one example, the disclosed embodiments may receive receipt information reflecting a bill to be split among a group of purchasers. The disclosed embodiments may parse the receipt information to extract one or more items or services having monetary value and generate a list of the items or services included in the receipt. The disclosed embodiments may also identify the group of purchasers that will participate in paying a proportion of the bill associated with the receipt. Further, disclosed embodiments may be configured to determine a proportion of payment of the total amount of the bill for each purchaser in the group of purchasers. In addition, the disclosed embodiments may be configured to provide mechanisms that enable at least one purchaser to provide payment for the at least one purchaser's payment amount for the bill, such as providing interfaces that allow the user to pay electronically using e-commerce payment systems or financial service products.

20 Claims, 8 Drawing Sheets

Related U.S. Application Data

(60) Provisional application No. 61/736,305, filed on Dec. 12, 2012.

(51) Int. Cl.
  *G06Q 30/04* (2012.01)
  *G06Q 50/00* (2012.01)
  *G06Q 20/22* (2012.01)
  *G06Q 30/02* (2012.01)

(56) References Cited

U.S. PATENT DOCUMENTS

2013/0173467 A1 7/2013 Nuzzi et al.
2014/0156508 A1 6/2014 Argue et al.

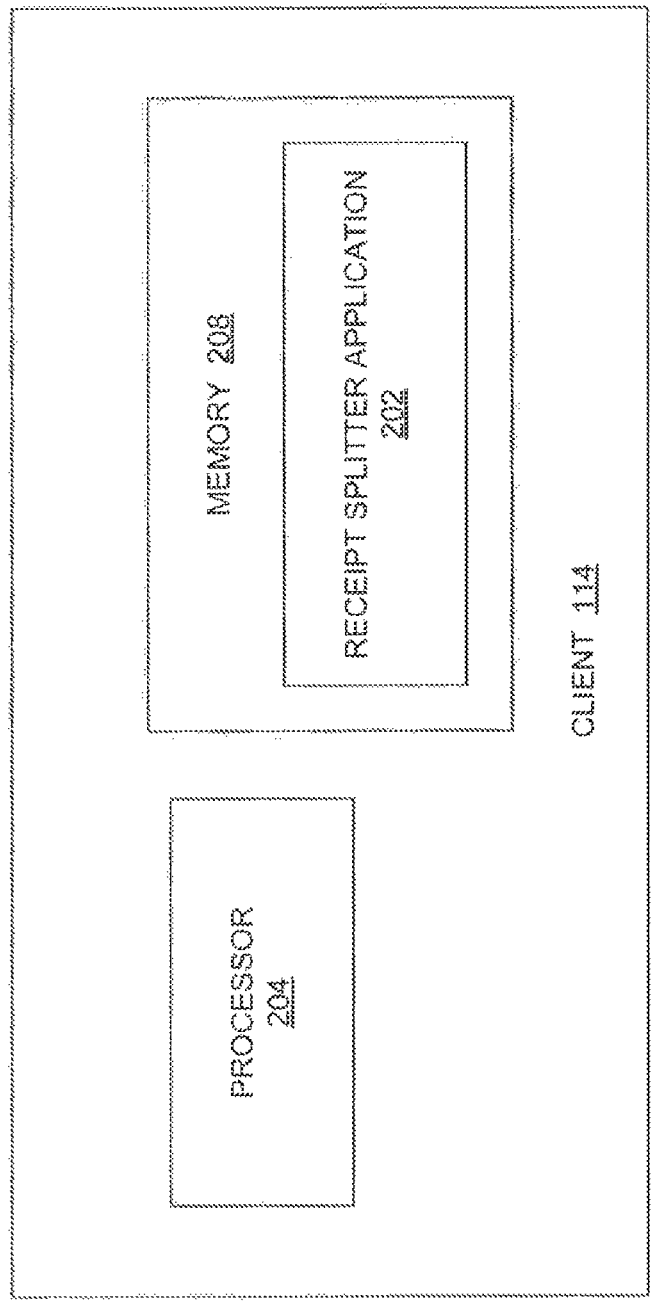

| Name | Number |
|------|--------|
| ☐ Richard | xxx-xxx-xxxx |
| ☐ Bryan | xxx-xxx-xxxx |
| ☐ Joshua | xxx-xxx-xxxx |

The Check has been dived evenly among all party members.....
Here is the Total:

Split Evenly

FIG. 4

| Name | Number |
|------|--------|
| ☐ Richard | xxx.xxx.xxxx |
| ☑ Bryon | xxx.xxx.xxxx |
| ☐ Joshua | xxx.xxx.xxxx |

The Check has been dived evenly among all party members....
Here is the Total:

[Split Evenly]

FIG. 5

Itemized List

| Select | | Item Price |
|---|---|---|
| | FRESH GRAPEFRUIT JUICE 32 OZ. | 3.29 T |
| | JUICE ORGANIC ORANGE STRAWBERR | 3.69 T |
| | NACHO KALE CHIPS | 3.99 T |
| | DARK CHOC ALMOND SIMPLY LITE, | 1.99 T |
| | CARBSAFE MILK CHOC BAR 3.5OZ | 1.99 T |

You owe $3.83. Thank you!

Pay Now

FIG. 6

SYSTEMS AND METHODS FOR SPLITTING A BILL ASSOCIATED WITH A RECEIPT

PRIORITY CLAIM

This is a continuation of application Ser. No. 14/103,743, filed Dec. 11, 2013, which claims the benefit of U.S. Provisional Application No. 61/736,305, filed Dec. 12, 2012. All of the foregoing applications are incorporated herein by reference.

FIELD

The disclosed embodiments generally relate to financial service products and systems, and more particularly, to systems, processes, and computer programs for determining the amount to split a bill associated with a receipt and assist a user to distribute the payment for the bill associated with the receipt.

Electronic personal payment transactions, such as person-to-person payment and person-to-business payment, represent a rapidly growing industry. There still exist, however, situations where people prefer to split bills and collect payment without benefiting from the convenience that electronic personal payment systems bring. For example, situations may arise in dealing with sharing payment when a group of friends have dinner together. One situation involves one person paying for the bill in full, keeping the receipt of the bill, and collecting payment from others in the group. Another situation involves the group of friends going through the trouble of determining how much each person has to pay and coordinating with each other for making the payment in full. Still another involves the merchant having to split the bill evenly (or in certain proportions) among the group of friends.

SUMMARY

Systems, methods, and articles of manufacture are disclosed for providing bill-splitting processes. In certain embodiments, systems, methods and computer programs are disclosed for splitting a bill associated with a receipt among a group of purchasers and assisting each of the group of purchasers to make the payment. Disclosed embodiments include mechanisms that receive a receipt of a bill to be split among a group of purchasers. The disclosed embodiments may parse information in the receipt to extract one or more items having monetary value. The disclosed embodiments may also identify the group of purchasers responsible for paying the bill associated with the receipt and determine how the bill is to be distributed between the group of purchasers based on the extracted one or more items. The disclosed embodiments may also generate and provide a link to a payment web page to each of the purchasers for collecting the distributed portion of the bill. Accordingly, some embodiments provide mechanisms that allow purchasers to easily distribute the payment of a bill associated with a receipt and enable each of the purchasers to pay the portion of the bill he/she is responsible for.

Consistent with some disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

FIG. 1B is diagram of an exemplary client that may be used to implement disclosed embodiments.

FIG. 4 is a screenshot of exemplary interface screen for obtaining the contact information of a group of purchasers consistent with the disclosed embodiments.

FIG. 5 is a screenshot of exemplary interface screen for confirming the purchasers consistent with the disclosed embodiments.

FIG. 6 is a screenshot of exemplary interface screen for sending a web page to a purchaser for collecting the payment for a bill consistent with the disclosed embodiments.

DESCRIPTION OF THE EMBODIMENTS

Figure 1A:
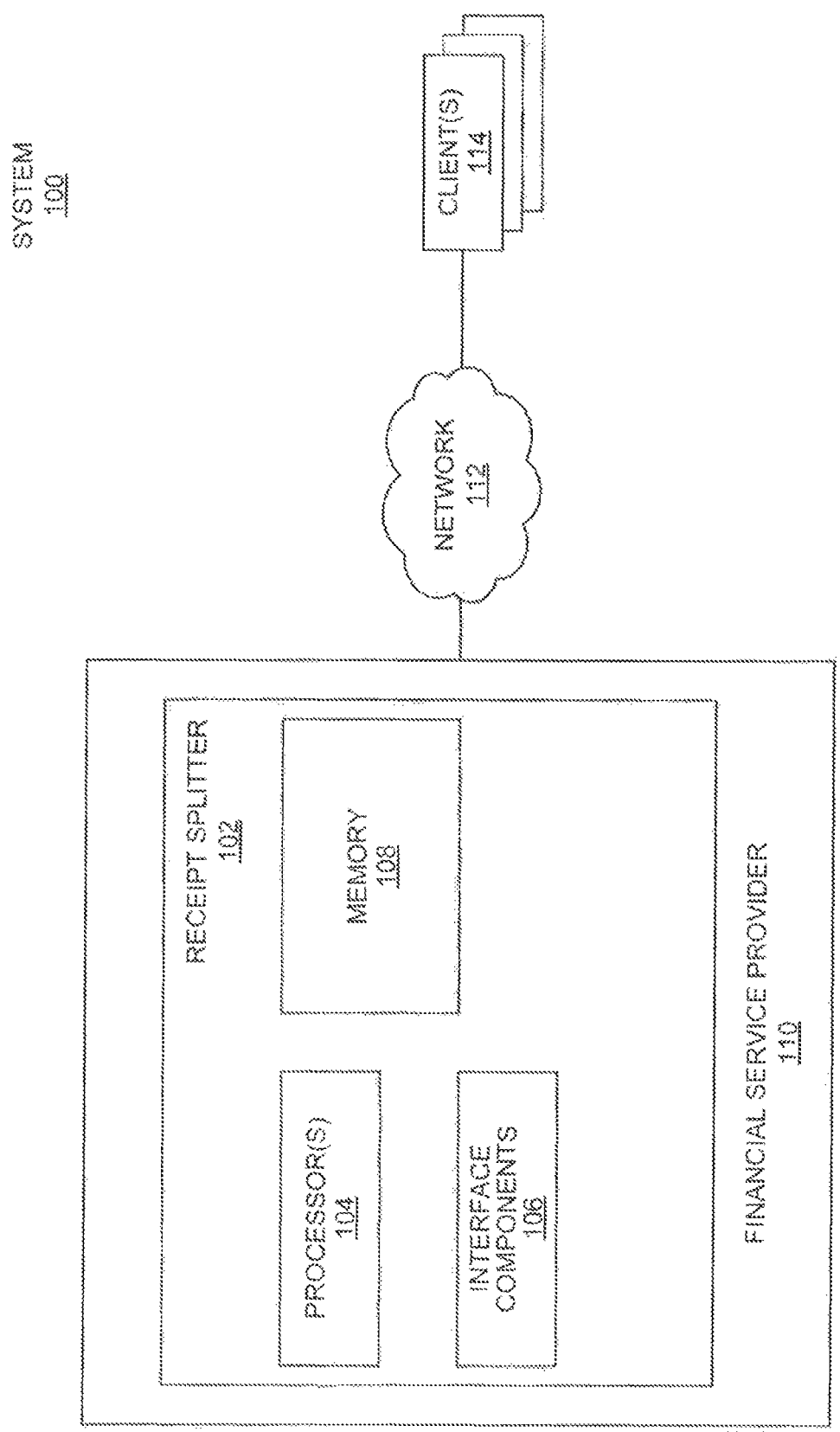
FIG. 1A is diagram of an exemplary system that may be used to implement disclosed embodiments.

It is to be understood that the following detailed description is exemplary and explanatory only and is not restrictive of disclosed embodiments. For example, steps or processes disclosed herein are not limited to being performed in the order described, but may be performed in any order, and that some steps may be omitted, consistent with the disclosed embodiments.

Reference will now be made in detail to exemplary embodiments, examples of which are illustrated in the accompanying drawings and disclosed herein. Wherever convenient, the same reference numbers may be used in the drawings and the following description to refer to the same or similar parts. Also, similarly named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations may be possible, without departing from the spirit and scope of the disclosure. Accordingly, the following detailed description does not limit the disclosure. Instead, the proper scope of the disclosure is defined by the appended claims.

FIG. 1A shows an exemplary system 100 configured to perform one or more processes consistent with the disclosed embodiments. In certain aspects, one or more components of system 100 may be configured to execute one or more software processes to provide one or more aspects of the disclosed embodiments. The components and arrangement shown in FIG. 1A are not intended to be limiting to the disclosed embodiments as the components that may be used to implement certain disclosed processes and features may vary.

In accordance with disclosed embodiments, system 100 may include financial service provider 110, receipt splitter 102, network 112, one or more clients 114. System 100 may include other components to provide, collect, process, and transmit information consistent with the disclosed embodiments.

Receipt splitter 102 may be a computer-based system including computer system components, such as one or more servers, desktop computers, workstations, memory devices, and/or internal network(s) connecting the components. In some embodiments, receipt splitter 102 may be a server that includes one or more processor(s) 104, memory devices, such as memory 108, and interface components 106. Receipt splitter 102 may be a single server or may be configured as a distributed computer system including multiple servers or computers that interoperate to perform one or more of the processes and functionalities associated with the disclosed embodiments. In certain embodiments, a receipt splitter server may be implemented as software located on a single physical processing device, or may be multiple software server programs stored on the same or multiple memory devices in a distributed manner.

In certain embodiments, receipt splitter 102 may be a server that is associated with financial service provider 110. Financial service provider 110 may represent, for example, a bank, a merchant, a credit card provider, or any other entity that provides financial services to customers. In some aspects, financial service provider 110 may be an institution or an individual that collects and processes the payment for a bill associated with a receipt, and transfers the payment to one or more intended payees. In other aspects, the functionalities performed by receipt splitter 102 as disclosed herein may be software that is executed by one or more processors associated with financial service provider 110. That is, instead of being computer-based system with hardware and software, receipt splitter 102 may represent software instructions stored in a memory (without hardware components) that are executed by a processor associated with financial service provider 110. The disclosed embodiments are not limited to receipt splitter 102 being associated with a financial service provider 110. For example, receipt splitter 102 may be associated with other types of entities, such as a merchant, retailer, or any other entity that may provide receipt splitting processes consistent with the disclosed embodiments.

Processor(s) 104 may be one or more known processing devices, such as a microprocessor from the Pentium™ family manufactured by Intel™ or the Turion™ family manufactured by AMD™. Processor(s) 104 may include a single core or multiple core processor system that provides the ability to perform parallel processes simultaneously. For example, processor(s) 104 may be a single core processor that is configured with virtual processing technologies known to those skilled in the art. In some embodiments, processor(s) 104 may use logical processors to simultaneously execute and control multiple processes. Processor(s) 104 may implement virtual machine technologies, or other similar known technologies to provide the ability to execute, control, run, manipulate, store, etc. multiple software processes, applications, programs, etc. In other embodiments, processor(s) 104 may include a multiple-core processor arrangement (e.g., dual or quad core) that is configured to provide parallel processing functionalities to allow receipt splitter 102 to execute multiple processes simultaneously. One of ordinary skill in the art would understand that other types of processor arrangements could be implemented that provide for the capabilities disclosed herein.

Receipt splitter 102 may also include one or more storage devices configured to store instructions used by processor(s) 104 (or other components) to perform certain functions related to the disclosed embodiments. In one example, receipt splitter 102 may include memory 108 that includes instructions to enable processor(s) 104 to execute one or more applications, such as server applications, network communication processes, or any other type of application or software available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

Methods, systems, and computer programs consistent with the disclosed embodiments are not limited to separate programs or computers configured to perform dedicated tasks. For example, receipt splitter 102 may include a memory that may include one or more programs to perform one or more functions for multiple user display control. Moreover, processor(s) 104 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Receipt splitter 102 may also be communicatively connected to one or more memory devices (e.g., databases (not shown)) locally or through a network. The remote memory devices may be configured to store information and may be accessed and/or managed by receipt splitter 102. By way of example, the remote memory devices may be document management systems, Microsoft SQL database, SharePoint databases, Oracle™ databases, Sybase™ databases, or other relational databases. Systems, processes, computer programs, and tangible computer-readable medium of disclosed embodiments, however, are not limited to separate databases or even to the use of a database.

Receipt splitter 102 may also include one or more I/O devices that may comprise one or more interfaces for receiving signals or input from input devices and providing signals or output to one or more output devices that allow data to be received and/or transmitted by receipt splitter 102. For example, receipt splitter 102 may include interface components 106 that may provide interfaces to one or more input devices, such as one or more keyboards, mouse devices, and the like, that enable receipt splitter 102 to receive data from one or more users such as client(s) 114. Furthermore, interface components 106 may include components configured to send and receive information between components of receipt splitter 102 or external to receipt splitter 102, such as network 112.

Network 112 may be any type of network that provides communications, exchanges information, and/or facilitates the exchange of information between receipt splitter 102 and client(s) 114. In one embodiment, network 112 may be the Internet, a Local Area Network, or other suitable connection(s) that enables system 100 to send and receive information between the components of system 100.

Client(s) 114 may be one or more computer systems. For example, client(s) 114 may include a general purpose or notebook computer, a mobile device with computing ability, a server, a desktop computer, tablet, or any combination of these computers and/or affiliated components. For example, client(s) 114 may be a smartphone, which is configured to perform one or more of the functions consistent with the disclosed embodiments. In some embodiments, each client may be a computer system or device that is operated by a user who is a customer or a potential customer of financial service provider 110. Client(s) 114 may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. Client(s) 114 may also include communication software that, when executed by a processor, provides communications with network 112, such as Web browser software, tablet or smart hand held device networking software, etc.

In certain embodiments, receipt splitter 102 may execute software that provides a receipt splitter application to client 114 for providing receipt splitter processes consistent with the disclosed embodiments. FIG. 1B shows an exemplary client 114 including a processor(s) 204 and a memory 208 including a receipt splitter application 202. In one aspect, receipt splitter 102 may send a receipt splitter mobile application to client 114 (which may be a mobile device). Alternatively, client 114 may receive a receipt splitter application from another source, such as a mobile application store via online application services. Client 114 may be configured to receive and store (e.g., in memory 208) the receipt splitter mobile application for execution to perform certain processes consistent with certain disclosed embodiments. Client 114 may execute the receipt splitter application via, for example, processor 204, in response to a user input (e.g., selecting an icon representing the receipt splitter application on their mobile device). Other manners to initiate execution of the receipt splitter application may also be implemented depending on the type of device that the application software is running on.

Aspects of the disclosed embodiments are disclosed in an exemplary scenario involving a group of purchasers who received a receipt from a restaurant business. However, aspects of the disclosed embodiments may be implemented to perform purchase splitting processes consistent with that disclosed herein for other types of documents, such as invoices, electronic invoices, bills, etc., payment requests from other types of entities or organizations, businesses, individuals (e.g., personal payment transactions between individuals), contractors. Thus, a receipt is not limited to a receipt provided by a retailer, a merchant, or the like (e.g., a restaurant bill, etc.), that provides items or services. A receipt may include other types of documents that may reflect a summary of items or services that were or may be provided, such as a document reflecting down payment for one or more items or services, etc.

Figure 2:
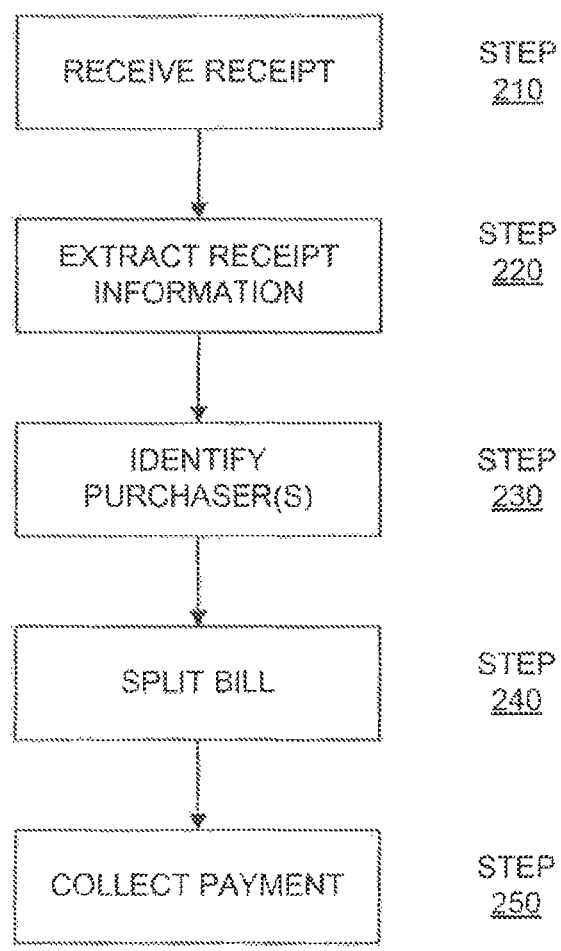
FIG. 2 is an exemplary receipt splitting process flow consistent with the disclosed embodiments.

FIG. 2 illustrates an exemplary process flow for performing receipt splitting processes consistent with the disclosed embodiments, such as, for example, splitting a bill based on the information in a receipt and collecting the payments associated with the bill from a group of purchasers. One or more processes of FIG. 2 may be performed by receipt splitter 102 or may be performed by receipt splitter application 202 executing on a client 114, or a combination of both.

Certain disclosed embodiments may be configured to perform processes including receiving a receipt from a user (some aspects are discussed in greater detail at step 210), parsing the information in the receipt and extract items having monetary value (some aspects are discussed in greater detail at step 220), identifying a group of purchasers responsible for paying the bill associated with the receipt (some aspects are discussed in greater detail at step 230), splitting the bill among the group of purchasers (some aspects are discussed in greater detail at step 240), and collected the payment from each of the group of purchasers (some aspects are discussed in greater detail at step 250).

In one embodiment, client 114 may be configured to execute receipt splitter application 202 to allow a user, who may be one of the purchasers in a group of purchasers, to collect receipt information from a receipt whose underlying bill will be split among the group of purchasers (e.g., step 210). Receipt splitter application 202 may receive the receipt or information relating to the receipt in different formats. For example, the user of client 114 may use image capture mechanisms included on client 114 that enable the user to capture an image (e.g., a digital photograph) of the receipt. In embodiments where receipt splitter 102 performs certain operations consistent with the disclosed embodiments, client 114 may send the captured image or receipt information to receipt splitter 102. For example, client 114 (e.g., a smartphone or a tablet) may send an electronic copy of the captured image of the receipt to receipt splitter 102.

In other embodiments, receipt splitter application 202 may receive information relating to the receipt in a barcode format. For example, the user of client 114 may use image capture mechanisms included on client 114 to capture barcode encoding information relating to a receipt, and send the captured barcode to receipt splitter 102. If the barcode is already stored on client 114, receipt splitter application 202 may be configured to generate an interface that is displayed on client 114 of the user that allows the user to upload the electronic barcode and send it to receipt splitter 102. In other aspects, client 114 (e.g., a smartphone or a tablet) may use mechanisms included on client 114 that enable the user to scan the barcode of the receipt and send it to receipt splitter 102. In certain embodiments, receipt splitter application 202 may execute software that causes client 114 to store the receipt image (or receipt information) in a memory on client 114. Receipt splitter application 202 may also execute software processes that cause client 114 to perform image processes on the image, such as OCR processes, to produce receipt information usable by receipt splitter application 202 (or receipt splitter 102). In some embodiments, receipt splitter application 202 may execute software processes (e.g., QR-Code Readers) that cause client 114 to perform barcode reading processes on the barcode provided by the user of client 114, to produce receipt information encoded in the barcode usable by receipt splitter application 202 (or receipt splitter 102).

Figure 3:
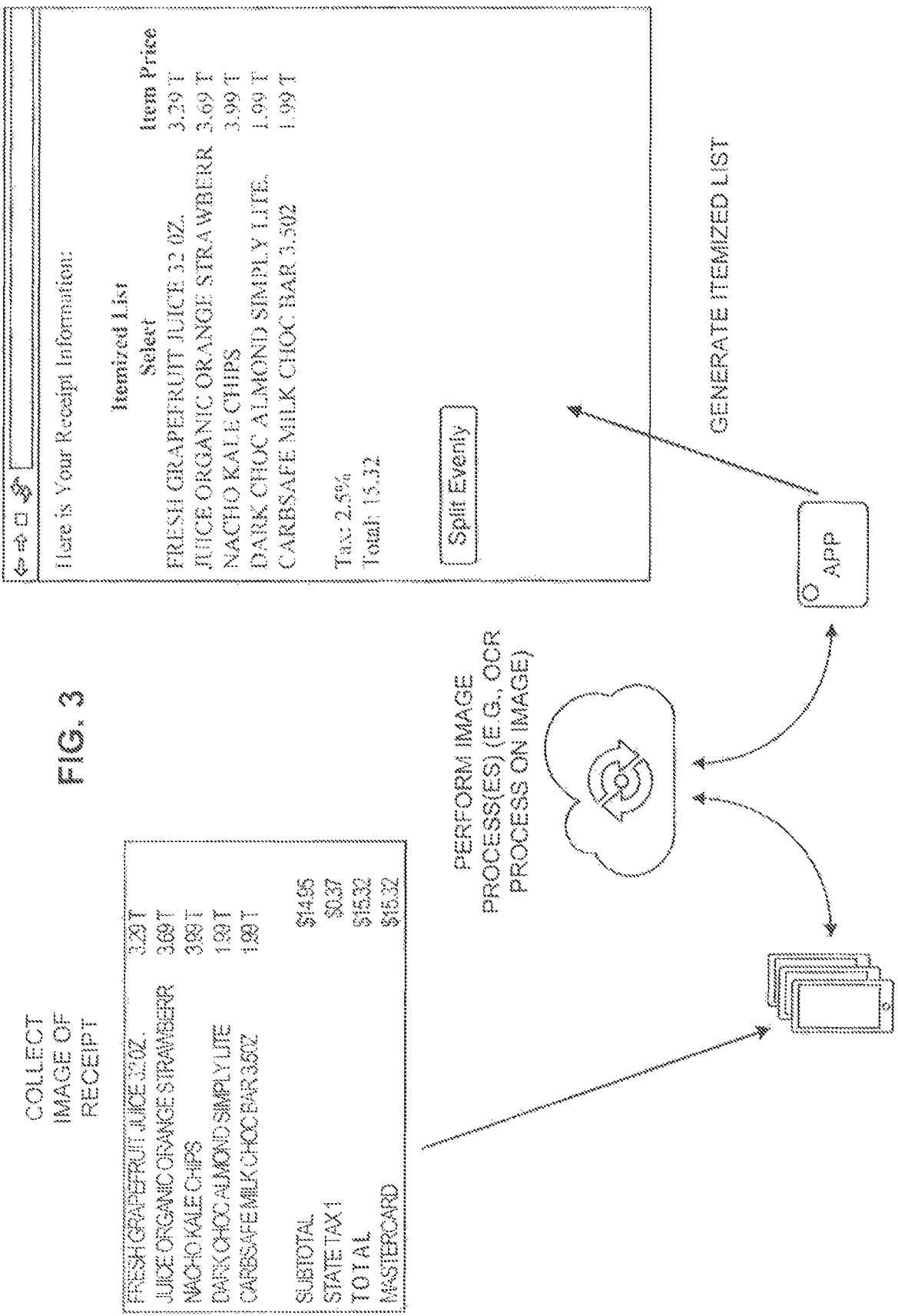
FIG. 3 is a screenshot of exemplary interface screen for parsing information in the receipt to extract items having monetary values consistent with the disclosed embodiments.

In one aspect, receipt splitter application 202 may use the receipt information produced by the image process(es) (e.g., OCR process) to parse and extract certain information from the receipt (e.g., step 220). In some aspects, receipt splitter application 202 may parse the information in the receipt to extract the line items and their corresponding monetary values. For example, receipt splitter application 202 may be configured to extract the purchased items, together with taxes and service charges (e.g., tips), and the total value on the receipt. In other aspects, receipt splitter application 202 may parse the information in the receipt to extract information relating to any survey that may be conducted. For example, if the receipt includes a website address on the receipt soliciting a user to participate in a survey, receipt splitter application 202 may be configured to retrieve this information, and generate an active link to the website that when selected directs the user to the website to participate in the survey. In other aspects, receipt splitter application 202 may be configured to parse the information in the receipt to extract information relating to any reward or loyalty program (e.g., coupon, discount, reward points, or the like). FIG. 3 shows a process flow of an exemplary receipt collection process consistent with disclosed embodiments.

In certain embodiments, receipt splitter application 202 may be configured to perform process(es) that identifies the purchases included in the group of purchasers who may be responsible for, or involved with, paying the bill associated with the receipt (e.g., step 230). In one aspect, receipt splitter application 202 may be configured to generate an interface that is displayed on client 114 of the user that allows the user to input identification information for one or more other purchasers who will split the receipt with the user. The interface may include input mechanisms that allow the user to input the name and/or contact information (e.g., email, phone number, social network handle(s), etc.) of each purchaser. FIG. 4 shows a diagram of an exemplary interface that may be provided by receipt splitter application 202 that includes the name and phone number (e.g., mobile phone number) of the other purchasers.

In other embodiments, to minimize the user's efforts of providing purchaser identification information, receipt splitter application 202 may be configured to determine suggested one or more candidates that may participate in paying the bill associated with the receipt. For example, receipt splitter application 202 may perform software processes that integrate with one or more social networking sites (e.g., Twitter, Facebook, LinkedIn, or the like) to obtain information regarding who might present at the location of client 114 associated with the user at the time when the user initiates or uses the receipt splitting processes of receipt splitter application 202. Thus, receipt splitter application 202 may be configured to identify one or more candidates based on the user's (or client 114's) location. For example, when the user initiates the execution of receipt splitter application 202 installed on client 114, receipt splitter application 202 may be configured to detect the user's location.

In one aspect, receipt splitter application 202 may request and receive GPS location information from a GPS process installed and executing on client 114 to determine the location of the user (or client 114). For example, client 114 may include and execute location processes such as foursquare, Google Latitude, and the like. Based on the detected location, receipt splitter application 202 may provide the user's (or client 114's) location to receipt splitter 102. In certain embodiments, one or more other purchasers with the user at the purchasing event associated with the receipt (e.g., who are with the user and will split the bill with the user) may also use a respective client device (e.g., client 114) having a corresponding receipt splitter application 202 installed. The receipt splitter application 202 executing on the client 114 associated with the one or more purchasers may also send to receipt splitter 102 GPS location information identifying the location of the respective purchaser(s). Receipt splitter 202 may receive the location information for the user and the one or more purchasers and determine whether the one or more purchasers are within a certain distance of the user (e.g., within a few feet, at the same address, etc.). Receipt splitter 102 may then determine and collect identification information for those purchaser(s) and send them to the receipt splitter application 202 on client 114 of the user. Receipt splitter application 202 executing on the user's client 114 may receive the purchaser identification information and integrate that information into a list of candidates for the user to view on a display, such as that shown in FIG. 4.

In some embodiments, to ensure the accuracy of the suggested candidate(s), receipt splitter application 202 may be configured to perform process(es) that allows the user to confirm whether a candidate purchaser is to participate in the receipt splitting process. For example, receipt splitter application 202 may be configured to perform process(es) that enables the user to add and/or delete one or more suggested candidates. FIG. 5 shows an exemplary interface including a user's confirmation of a candidate purchaser (e.g., check box for "Bryan"). Other mechanisms for confirming the one or more participating purchasers may be implemented, and the disclosed embodiments are not limited to the features exemplified in FIGS. 4 and 5, or any other interfaces described herein. In one aspect, receipt splitter application 202 may include in the list of candidates the user associated with client 114 so that the user can select himself or herself as a participating purchaser. In other aspects, receipt splitter application 202 may automatically identify the user and include the user in the list participating purchasers. For instance, in one aspect, receipt splitter application 202 may include in the interface the name and contact information for the user along with the other candidate purchasers, with the user's check box automatically selected by receipt splitter application 202.

Aspects of the disclosed embodiments enable a user (or the group of purchasers) to select how the receipt is to be distributed. In one aspect, receipt splitter application 202 may present an option in an interface displayed on the user's client 114 that requests that the user confirm that the bill for the receipt will be split evenly. FIG. 5 shows an exemplary "Split Evenly" option that the user may select. Other options may be offered by the disclosed embodiments. For example, receipt splitter application 202 may provide an option for the user to select a percentage for each participating purchaser will contribute. Thus, the disclosed embodiments allow the bill to be split in one or more ways including, for example, splitting evenly or by percentage, assigning one or more purchased items and related charges to one or more purchasers in the group, or the like.

In certain aspects, the disclosed embodiments may be configured to provide a mechanism that allows the user and the group of purchasers to be involved in how to split the bill associated with the receipt. For example, receipt splitter application 102 may be configured to send to each client 114 having a receipt splitter application 202 associated with the purchasers (including the user), the itemized list of items generated from the receipt capture processes disclosed above. In such aspects, the receipt splitter application 202 on the client 114 for the user may have sent a copy of the itemized list to receipt splitter 102, or receipt splitter 102 may have generated the itemized list based on an image of the receipt provided by the client 114. The receipt splitter application 202 on each client 114 for the purchaser(s) may display, on an interface, the purchased items and any related charges (e.g., taxes, service charges) associated with the receipt. The receipt splitter application 202 on each client 114 may enable each purchaser to choose one or more items that he/she will be responsible for paying. Additionally or alternatively, the receipt splitter application 202 for each purchaser may be configured to allow the purchaser to enter the amount of money he/she should be responsible for. Each receipt splitter application 202 may send the selections from the purchasers to receipt splitter 102, which processes the information to generate a final receipt splitter list for the receipt that indicates the amount owed by each purchaser.

In other embodiments, receipt splitter 102 may be configured to perform the processes described above. For example, receipt splitter application 202 may generate and provide a link to a website or other location associated with receipt splitter 102 that the purchaser, via a client 114, will be directed to when selected. Receipt splitter 102 may generate an interface that is displayed on each purchaser's client 114 that includes the itemized list of items and allows each purchaser to select the items that they will pay, or to enter in the amount of money the purchaser may contribute to the cost of the bill for the receipt.

Based on the selection of how the bill will be split, receipt splitter application 202 (or receipt splitter 102) may perform processes to split the bill associated with the receipt (e.g., step 240). In one aspect, the disclosed embodiments may use contact information for each purchaser to facilitate payment for the bill (e.g., step 250).

In one aspect, receipt splitter application 202 may be configured to obtain the contact information for each of the selected one or more purchasers who may participate in the receipt splitting process. In one aspect, receipt splitter application 202 may use the contact information provided in the list of purchasers (e.g., FIG. 5). In other embodiments, receipt splitter application 202 may execute that obtains purchaser contact information via other sources, such as social networking sites, the user's contact list stored on client 114, etc.

Based on the determined way of splitting the bill associated with the receipt, receipt splitter application 202 may be configured to collect payment from the purchasers (including the user) (e.g., step 250). In some embodiments, receipt splitter application 202 may be configured to generate an interface that is displayed on the user's (or purchaser's) client 114 including information reflecting the amount owed by the user or purchaser. For example, the interface may include information reflecting the purchased items, the total value on the receipt, and/or the total amount the particular user/purchaser should be responsible for. FIG. 6 shows an exemplary receipt splitting interface may be provided to a user indicating the amount owed by the user. Other types of interfaces and information provided in the interfaces may be implemented and provided by the disclosed embodiments.

Certain disclosed embodiments provide mechanisms that enable the user/purchaser to make the payment for the distributed bill. In certain aspects, each client 114 including a receipt splitter application 202 may execute processes that receive the distribution amount to apply to the respective purchaser, and generate an interface that enables the user to provide electronic payment for the distributed amount assigned to that purchaser. In other aspects, receipt splitter 102 may provide similar functionalities by providing a website or other medium that the purchaser(s) can access and use to facilitate payment.

Figure 7:
FIG. 7 is a screenshot of exemplary interface screen for a purchaser to make the payment for a bill consistent with the disclosed embodiments.

For example, receipt splitter application 202 may generate interfaces that allow the user/purchaser to select the type of electronic payment method to use to pay the bill. FIG. 6 shows in the exemplary interface an option for the user to select that will initiate electronic payment (e.g., "Pay Now"). Upon selection, receipt splitter application 202 may provide an interface that allows the user to select the type of electronic payment service or financial service product to use to pay the distributed amount of the bill for the user/purchaser. FIG. 7 shows an exemplary interface that may be provided and displayed via client 114 to allow a user/purchaser to make payment for their distributed amount for the bill associated with the receipt.

Thus, for example, receipt splitter application 202 may be configured to provide options for the user to provide payment via one or more ways such as, for example, credit card or debit card (which may be associated with financial service provider 110), PayPal™, reward points, or any other known method of electronic payment. In such embodiments, receipt splitter application 202 may generate an interface to collect payment information from the purchaser. The disclosed embodiments may use known electronic payment processes to collect payment from the purchaser.

In certain embodiments, receipt splitter 102 may be configured to perform software processes consistent with the functionalities disclosed above.

In certain aspects, receipt splitter 102 and/or receipt splitter application 202 may be configured to perform other functions consistent with the disclosed embodiments. For example, the user of client 114 may make a payment request on client 114 without providing a receipt consistent with the disclosed embodiments. For example, receipt splitter application 202 may be configured to generate an interface that is displayed on client 114 of the user that allows the user to provide information relating to the bill to be split (e.g., the event triggering the bill, the monetary value to be split). In some aspects, receipt splitter application 202 may execute software that allows the user of client 114 to send information relating to the event triggering the bill when making the payment request. For example, the user of client 114 may upload a ticket for a special event that triggers the bill (e.g., sports, concerts, theater).

As another example, if a receipt that was provided by the user to client 114 included information reflecting a website address, such as an address for the user to conduct a survey, receipt splitter 102 and/or receipt splitter application 202 may be configured to extract the website address information from the receipt when processing the receipt information (e.g., after OCR processes completed, after QR-Code reading processes completed). The survey may be provided in the form of a barcode or text reflecting the website address. Receipt splitter 102 and/or receipt splitter application 202 may perform processes that recognizes the address information and generates a link to the address that may be included in an interface displayed by client 114. In other embodiments, receipt splitter 102 and/or receipt splitter application 202 may be configured to generate and send a notification to the user using other mediums, such as an email, SMS messaging, etc. In other embodiments, receipt splitter 102 and/or receipt splitter application 202 may be configured to receive and store the results of any survey that the user may have performed based on the provided website address. For example, if conducting the survey entitles the user to some rewards (e.g., discount, gift card, loyalty points, etc.), receipt splitter 102 and/or receipt splitter application 202 may be configured to store reward information that may be used by receipt splitter 102 and/or receipt splitter application 202 at another time the user performs receipt splitting processes consistent with the disclosed embodiments.

As another example, if the receipt contains information relating to a reward program for future purchases (e.g., discount, coupon), receipt splitter 102 and/or receipt splitter application 202 may be configured to identify and extract the information relating to the reward program. Based on this information, receipt splitter 102 and/or receipt splitter application 202 may be configured to generate an interface for display on client 114 to distribute the reward to the purchasers participating in the receipt splitting process for paying the bill associated with the receipt. The client 114 associated with each purchaser may receive a notification that the user has distributed the reward to the purchaser via receipt splitter 102 and/or receipt splitter application 202. In certain aspects, receipt splitter 102 and/or receipt splitter application 202 may be configured to store the reward information in a memory for use by one or more accounts associated with the participating purchasers for possible application to future purchase(s).

As another example, receipt splitter 102 and/or receipt splitter application 202 may be configured to generate and provide for display on client 114 one or more commercial messages. For example, before or during a receipt splitting event associated with a bill to be split, receipt splitter 102 and/or receipt splitter application 202 may be configured to generate and provide a message that includes information relating to one or more promotional offer (e.g., discount) if the user spends a certain amount of money, purchases a certain item or service, etc.

In another embodiment, receipt splitter 102 and/or receipt splitter application 202 may be configured to perform processes that integrate with social networking sites (e.g., Twitter, Facebook, LinkedIn) to perform functions that allow the user to communicate via these social networking sites. For example, receipt splitter 102 and/or receipt splitter application 202 may perform processes that enable the user to provide comments regarding whether the user likes or dislikes the business associated with the receipt, and/or to check whether there are some special deals provided by the business. Receipt splitter 102 and/or receipt splitter application 202 may provide the comments to the social networking site of the user's choice, or provide a link directly to the social networking site that the user may use to access and use that site.

In other embodiments, receipt splitter 102 may be configured to provide processes that allow the user to rate his/her experience relating to receipt splitting processes consistent with the disclosed embodiments. In some embodiments, receipt splitter 102 and/or receipt splitter application 202 may be configured to perform processes that allow the user to share his/her experiences using social networking sites or other broadcast mediums.

In one embodiment, receipt splitter 102 and/or receipt splitter application 202 may be configured to perform gamification functions. For example, receipt splitter 102 and/or receipt splitter application 202 may perform process(es) that determines and generates one or more incentives (both virtual and/or real) for rewarding the user for using the receipt splitting application software on client 114. Virtual rewards may include earning status such as, for example, a gold/silver/bronze or superstar/starlet/standing ratings associated with the user and/or the user's financial service account used to pay for the portion of the bill using the receipt splitting processes. Real and virtual rewards may also be given for sharing the bill splitting experience via social networking sites and recommending it to other entities or users (e.g., friends, business partners, etc.). The disclosed embodiments may execute software that may convert virtual rewards to real awards based on the rating level. For example, when receipt splitter 102 or receipt splitter application 202 determines that the user has used the receipt splitter application 202 a certain number of times, and thus has reached a certain virtual reward level, the application may provide or notify client 114 of real reward offers (or inform receipt splitter 102 to initiate or provide a real reward offer), such as discounts, monetary transfers, coupons, etc.

The disclosed embodiments may be associated to different types of financial services. Any financial institution that provides financial service accounts to customers may employ systems, methods, and articles of manufacture consistent with certain principles related to the disclosed embodiments. In addition, other types of entities, such as a merchant, retailer, or other type corporate entity that may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for providing receipt splitting processes, comprising:
   a processor; and
   a storage device storing instructions that, when executed by the processor, cause the system to perform operations comprising:
   receiving receipt information reflecting a bill for one or more purchased items or services, the bill including a total monetary amount;
   integrating with one or more social networking sites of a user;
   obtaining from the one or more social networking sites location information for one or more individuals associated with the user;
   determining location information indicating a location of the user;
   identifying a subset of individuals present and associated with the user as candidate purchasers based at least on the location information of the user and the location information of the one or more individuals associated with the user,
   wherein the candidate purchasers comprise one or more associated individuals located within a predetermined distance of the user;
   transmitting, to the user, display data regarding information identifying the candidate purchasers;
   receiving a selection of one or more purchasers identified from the display data, wherein the selected purchasers comprise one or more of the candidate purchasers; and
   enabling the one or more selected purchasers to access an interface provided by the system that includes functionality to enable the one or more selected purchasers to make an electronic payment for a portion of the total monetary amount.

2. The system of claim 1, wherein the operations further include parsing the receipt information to extract website address information relating to a survey from the receipt information.

3. The system of claim 2, wherein the operations further include providing a website link to a website associated with the survey based on the extracted website address information.

4. The system of claim 1, wherein determining location information indicating the location of the user comprises requesting and receiving GPS location information from a GPS process.

5. The system of claim 1,
wherein the operations further include displaying data, to the user, regarding information identifying the user with the candidate purchasers; and
wherein the selected purchasers further comprise the user.

6. The system of claim 1, wherein the operations further include receiving the receipt information in at least one of a plurality of formats, the plurality of formats comprising barcode and image formats.

7. A system for providing receipt splitting processes, comprising:
a processor; and
a storage device storing instructions that, when executed by the processor, cause the system to perform operations comprising:
receiving receipt information reflecting a bill for one or more purchased items or services, the bill including a total monetary amount;
generating an itemized list of the one or more purchased items or services based on the receipt information;
integrating with one or more social networking sites of a user;
obtaining from the one or more social networking sites location information for one or more individuals associated with the user;
determining location information indicating a location of the user;
identifying a subset of individuals present and associated with the user as candidate purchasers based at least on the location information of the user and the location information of the one or more individuals associated with the user,
wherein the candidate purchasers comprise one or more associated individuals located within a predetermined distance of the user;
transmitting, to the user, display data regarding information identifying the candidate purchasers;
receiving a selection of one or more purchasers identified from the display data, wherein the selected purchasers comprise one or more of the candidate purchasers; and
enabling the one or more selected purchasers to access an interface provided by the system that includes functionality to enable the one or more selected purchasers to make an electronic payment for an amount based on the itemized list.

8. The system of claim 7, wherein the operations further include parsing the receipt information to extract website address information relating to a survey from the receipt information.

9. The system of claim 7, wherein determining location information indicating the location of the user comprises requesting and receiving GPS location information from a GPS process.

10. The system of claim 7,
wherein the operations further include displaying, to the user, data regarding information identifying the user with the candidate purchasers; and
wherein the selected purchasers further comprise the user.

11. The system of claim 7, wherein the operations further include receiving the receipt information in at least one of a plurality of formats, the plurality of formats comprising barcode and image formats.

12. A method for performing receipt splitting, comprising:
receiving, by one or more processors, receipt information reflecting a bill for one or more purchased items or services, the bill including a total monetary amount;
integrating, by the one or more processors, with one or more social networking sites of a user;
obtaining from the one or more social networking sites location information for one or more individuals associated with the user;
determining, by the one or more processors, location information indicating a location of the user;
identifying, by the one or more processors, a subset of individuals present and associated with the user as candidate purchasers based at least on the received location information of the user and the location information of the one or more individuals associated with the user,
wherein the candidate purchasers comprises one or more associated individuals located within a predetermined distance of the user;
transmitting, to the user, by the one or more processors, display data regarding information identifying the candidate purchasers;
receiving a selection of one or more purchasers identified from the display data, wherein the selected purchasers comprise one or more of the candidate purchasers; and
enabling, by the one or more processors, the one or more selected purchasers to access an interface provided by the one or more processors that includes functionality to enable the one or more selected purchasers to make an electronic payment for a portion of the total monetary amount.

13. The method of claim 12, further comprising parsing the receipt information to extract website address information relating to a survey from the receipt information.

14. The method of claim 12, wherein determining location information indicating the location of the user comprises requesting and receiving GPS location information from a GPS process.

15. The method of claim 12,
wherein the method further comprises displaying, to the user, data regarding information identifying the user with the candidate purchasers; and
wherein the selected purchasers further comprise the user.

16. The method of claim 12, wherein the receipt information is in at least one of a plurality of formats, the plurality of formats comprising barcode and image formats.

17. A method for performing receipt splitting, comprising:
receiving, by one or more processors, receipt information reflecting a bill for one or more purchased items or services, the bill including a total monetary amount;
generating, by the one or more processors, an itemized list of the one or more purchased items or services based on the receipt information;
integrating, by the one or more processors, with one or more social networking sites of a user;
obtaining from the one or more social networking sites location information for one or more individuals associated with the user;
determining, by the one or more processors, location information indicating a location of the user;
identifying, by the one or more processors, a subset of individuals present and associated with the user as candidate purchasers based at least on the received location information of the user and the location information of the one or more individuals associated with the user, wherein the candidate purchasers comprises one or more associated individuals located within a predetermined distance of the user;

transmitting, to the user, by the one or more processors, display data regarding information identifying the candidate purchasers;

receiving a selection of one or more purchasers identified from the display data, wherein the selected purchasers comprise one or more of the candidate purchasers; and enabling, by the one or more processors, the one or more selected purchasers to access an interface provided by the one or more processors that includes functionality to enable the one or more selected purchasers to make an electronic payment for an amount based on the itemized list.

18. The method of claim 17, further comprising parsing the receipt information to extract website address information relating to a survey from the receipt information.

19. The method of claim 17, wherein determining location information indicating the location of the user comprises requesting and receiving GPS location information from a GPS process.

20. The method of claim 17, wherein the method further comprises displaying, to the user, data regarding information identifying the user with the candidate purchasers; and wherein the selected purchasers further comprise the user.

* * * * *